United States Patent
Shin et al.

(10) Patent No.: US 9,185,518 B2
(45) Date of Patent: Nov. 10, 2015

(54) MOBILE TERMINAL AND CONTROLLING METHOD THEREOF

(71) Applicant: LG ELECTRONICS INC., Seoul (KR)

(72) Inventors: Eunjeong Shin, Seoul (KR); Nansaem Yoo, Seoul (KR); Yongjik Lee, Seoul (KR); Hyunsook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 14/161,276

(22) Filed: Jan. 22, 2014

(65) Prior Publication Data

US 2015/0045065 A1    Feb. 12, 2015

(30) Foreign Application Priority Data

Aug. 8, 2013    (KR) .................. 10-2013-0094088

(51) Int. Cl.
*H04W 4/02* (2009.01)
*G06Q 10/04* (2012.01)
*G06Q 10/10* (2012.01)

(52) U.S. Cl.
CPC .............. *H04W 4/02* (2013.01); *G06Q 10/047* (2013.01); *G06Q 10/109* (2013.01)

(58) Field of Classification Search
None
See application file for complete search history.

(56) References Cited

U.S. PATENT DOCUMENTS

| | | | |
|---|---|---|---|
| 2004/0054468 A1 | 3/2004 | Yamada et al. | |
| 2004/0100460 A1* | 5/2004 | Yamada et al. | 345/204 |
| 2004/0203863 A1* | 10/2004 | Huomo | 455/456.1 |
| 2004/0259573 A1* | 12/2004 | Cheng | 455/456.3 |
| 2009/0105947 A1* | 4/2009 | Nachesa et al. | 701/209 |
| 2010/0026526 A1 | 2/2010 | Yokota | 340/996 |
| 2011/0029474 A1* | 2/2011 | Lin | 706/50 |
| 2012/0289254 A1* | 11/2012 | Dishneau | 455/456.3 |
| 2013/0096813 A1 | 4/2013 | Geffner et al. | |
| 2013/0113739 A1* | 5/2013 | Lee | 345/173 |
| 2014/0195951 A1* | 7/2014 | Lee et al. | 715/771 |
| 2015/0038174 A1* | 2/2015 | Chu et al. | 455/456.3 |

FOREIGN PATENT DOCUMENTS

| | | | |
|---|---|---|---|
| WO | WO 2008/002127 A1 | 1/2008 | |
| WO | WO 2013/100902 A1 | 7/2013 | |

* cited by examiner

*Primary Examiner* — Kimberly A Williams
(74) *Attorney, Agent, or Firm* — Birch, Stewart, Kolasch & Birch, LLP

(57) ABSTRACT

Disclosed are a mobile terminal and controlling method thereof, by which geographical information including POI (point of interest) of a user can be displayed. The present invention includes a memory storing at least one of a POI (point of interest) information including a POI time information and a geographical information, a display unit configured to display the POI information and the geographical information, and a controller, if a command for displaying the geographical information and the POI information is received, searching the memory for the POI information and the geographical information in a prescribed distance with reference to random reference coordinates, the controller controlling the display unit to display the found POI information and the found geographical information.

7 Claims, 11 Drawing Sheets

FIG. 3
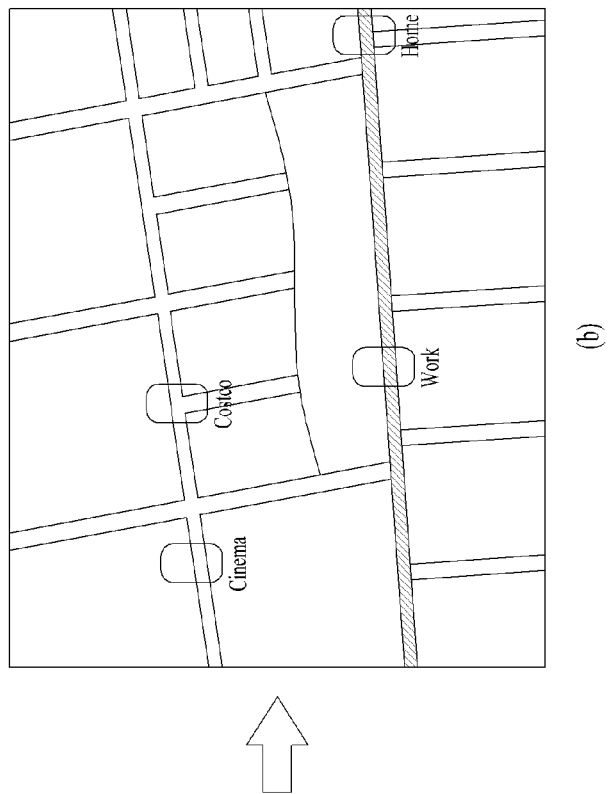
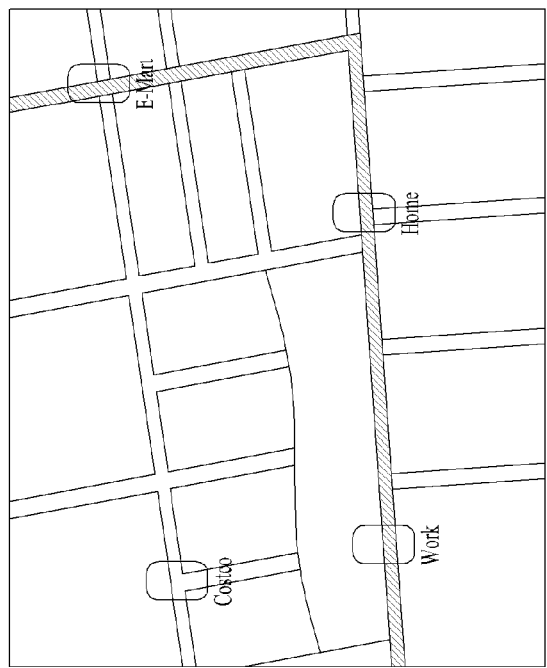

FIG. 11
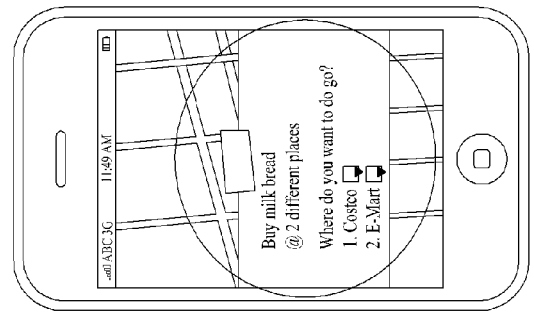
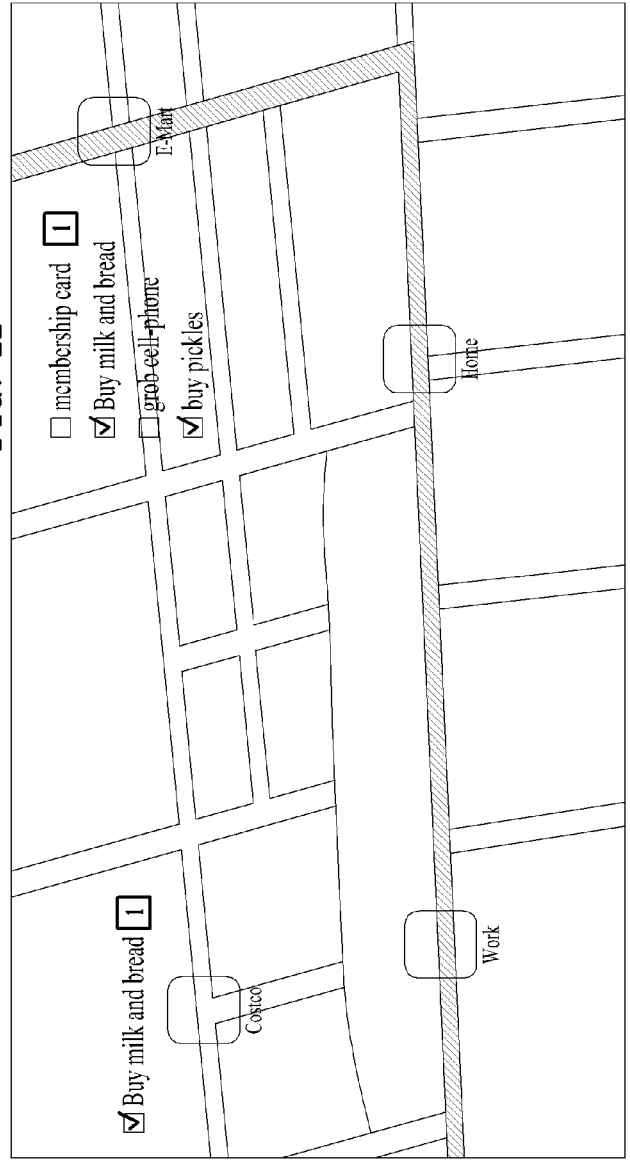
(a)
(b)

MOBILE TERMINAL AND CONTROLLING METHOD THEREOF

Pursuant to 35 U.S.C. §119(a), this application claims the benefit of earlier filing date and right of priority to Korean Application No. 10-2013-0094088, filed on Aug. 8, 2013, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for displaying geographical information including POI (point of interest) of a user.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

Beyond the stage of simply delivering audio, the technological developments of a mobile terminal enable various kinds of application programs to be installed on the mobile terminal to meet the demands of users and also enable the mobile terminal to use various data related to the installed application programs. And, the scope of the data can cover various fields including personal information (e.g., SMS (short message service) reception/transmission history, etc.) saved in the mobile terminal, self-created data (e.g., photo/video created using a mounted camera, etc.), contents (e.g., an e-book downloaded from a server of a mobile communication service provider, picture friends, bell sounds, MP3, etc.) and the like. In this case, the mobile terminal may include one of a mobile communication terminal (i.e., a wireless terminal), a PDA (personal digital assistant), a PMP (portable multimedia player), and the like.

Recently, a mobile terminal equipped with a GPS function as well as a map function having geographical information tends to be increasingly used. And, the demand for necessity of a technology for providing a user with geographical information on an area of interest efficiently is rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a user's schedule can be interconnected with map information.

Therefore, if a user's schedule is planned at a specific location in a specific time, the corresponding information can be provided to the user.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a memory storing at least one of a POI (point of interest) information including a POI time information and a geographical information, a display unit configured to display the POI information and the geographical information, and a controller, if a command for displaying the geographical information and the POI information is received, searching the memory for the POI information and the geographical information in a prescribed distance with reference to random reference coordinates, the controller controlling the display unit to display the found POI information and the found geographical information.

Preferably, the POI time information may include user's per-view interest information corresponding to a POI (point of interest).

More preferably, the per-view interest information may include a day-based interest information and an hour-based interest information on a prescribed day. In this case, the day-based interest information may include a per-day schedule list of the user at the POI and the hour-based interest information may include a per-hour schedule list of the user at the POI.

In this case, the mobile terminal may further include a signal input unit. If a $1^{st}$ input signal is received through the signal input unit, the controller may change the POI information and the geographical information displayed on the display unit by shifting the reference coordinates.

Moreover, if a $2^{nd}$ input signal is received through the signal input unit, the controller may control the display unit to display the hour-based interest information of a prescribed POI. If a $3^{rd}$ input signal is received through the signal input unit, the controller may control the display unit to display the day-based interest information of the prescribed POI. If a $4^{th}$ input signal is received, the controller may control the display unit to display a keyword information of the POI.

Besides, if the signal input unit includes a touchscreen, the $1^{st}$ input signal may include an input signal in a right/left direction, the $2^{nd}$ input signal may include an input signal in a top/bottom direction, the $3^{rd}$ input signal may include an input signal within a prescribed time range in a prescribed region of the touchscreen, and the $4^{th}$ input signal may include an input signal maintained on a prescribed region of the touchscreen over a prescribed duration.

More preferably, the controller may determine a current location of the user. If a schedule of the user exists within a prescribed time at a POI in a prescribed distance from the current location of the user, the controller may control the display unit to display a $1^{st}$ indication signal.

In this case, if a $1^{st}$ user schedule at a $1^{st}$ POI and a $2^{nd}$ user schedule at a $2^{nd}$ POI are identical to each other, the controller may control the display unit to display a $2^{nd}$ indication signal informing the user that the identical schedules exist. Moreover, the controller may control the display unit to display a schedule display window for enabling the user to set whether the schedule is completed. If the $1^{st}$ user schedule is set as completed through the schedule display window, the controller may also set the $2^{nd}$ user schedule as completed.

In another aspect of the present invention, a method of controlling a mobile terminal according to the present invention includes the steps of receiving a command for displaying a geographical information and a POI (point of interest) information, searching for the POI information and the geographical information in a prescribed distance with reference to random reference coordinates, and displaying the found POI information and the found geographical information.

Preferably, the method may further include the steps of if a $1^{st}$ input signal is received, changing and displaying the POI information and the geographical information by shifting the reference coordinates, a $2^{nd}$ input signal is received through the signal input unit, displaying the hour-based interest information of a prescribed POI, if a $3^{rd}$ input signal is received through the signal input unit, displaying the day-based interest information of the prescribed POI, and if a $4^{th}$ input signal is received, displaying a keyword information of the POI.

Accordingly, the present invention provides the following effects and/or advantages.

First of all, the present invention facilitates a user to recognize a user's schedule at a user's POI (point of interest).

Secondly, the present invention facilitates a user to obtain information on a frequently visited place, thereby facilitating the user to recognize a user's schedule list frequently performed in the corresponding place.

Thirdly, the present invention enables a user to recognize a user's schedule per hour and date in response to a user's input signal, thereby enhancing user's convenience.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 3 to 6 are diagrams to describe changes of a screen displayed on a display unit in response to $1^{st}$ to $4^{th}$ input signals in a mobile terminal according to a $1^{st}$ embodiment of the present invention, respectively;

FIG. 10 and FIG. 11 are diagrams of a screen displayed on a display unit according to a $3^{rd}$ embodiment of the present invention, respectively.

DETAILED DESCRIPTION OF THE INVENTION

In the following detailed description, reference is made to the accompanying drawing figures which form a part hereof, and which show by way of illustration various embodiments.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Hereinafter, the elements of the mobile device will be described by referring to FIG. 1. The mobile device includes at least one of the elements illustrated in FIG. 1.

Figure 1:
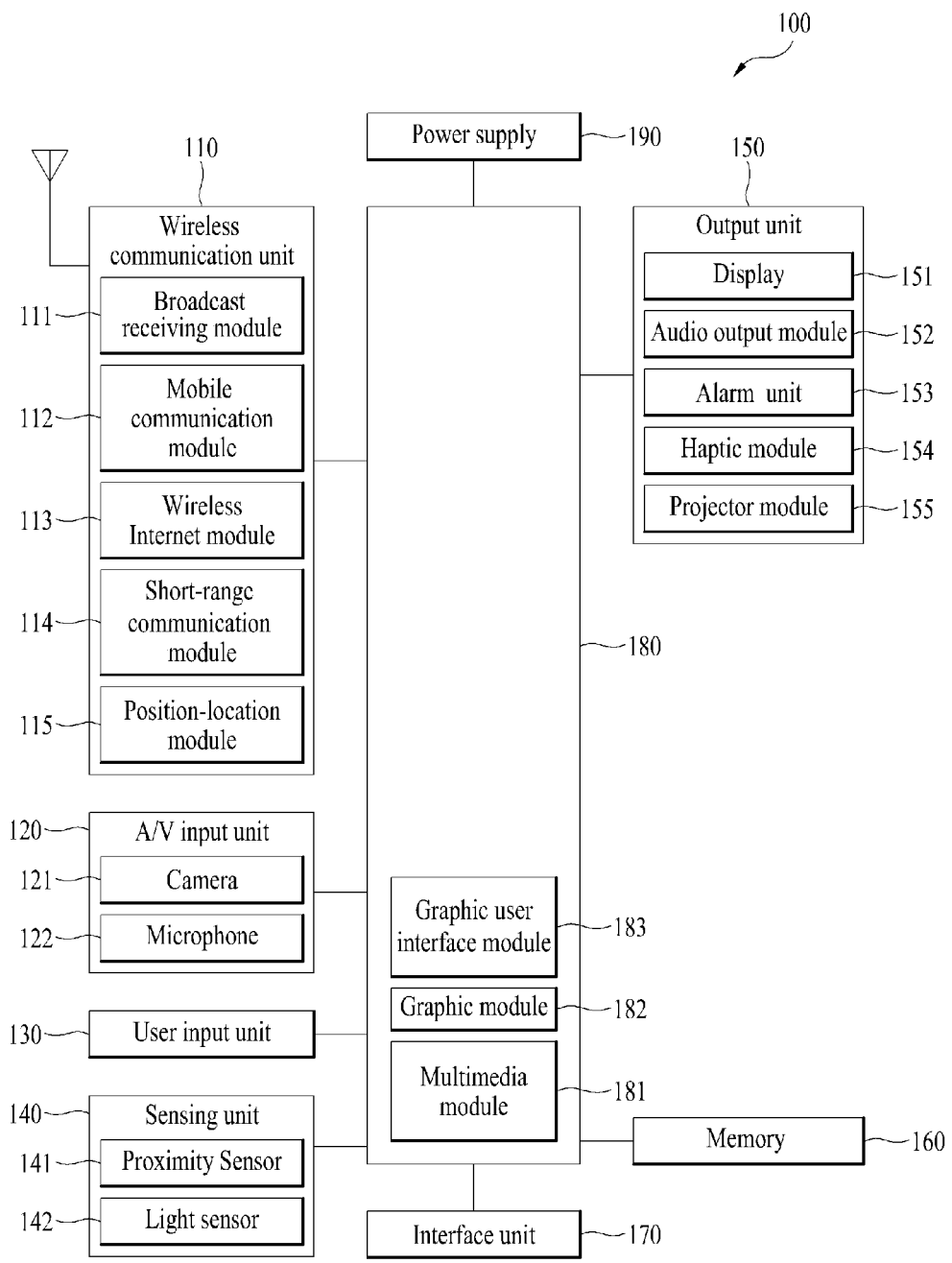
FIG. 1 is a block diagram of a mobile terminal according to one embodiment of the present invention.

FIG. 1 is a block diagram of a mobile terminal according to one embodiment of the present invention.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc. Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. The GPS module is capable of operating with a GPS satellite transmitting coordinate information of a current position and coordinate information of a navigating position. The display module 151 of the mobile device 100) displays geographical information using GPS coordinate information from the GPS satellite. Also, the mobile device 100 can receive coordinate information of an arbitrary position selected by a user even though the GPS coordinate information from the GPS satellite is not transmitted, and the display module 151 can display at least one of a geographical information and a POI (point of interest) information. The GPS module is able to precisely determine GPS coordinate information, for example, coordinate including longitude, latitude etc, of a current position of the mobile device 100 based on information from GPS satellites.

Referring to FIG. 1, the audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input module 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 may include a proximity sensor 141.

The output unit 150 may generate outputs relevant to the senses of sight, hearing, touch and the like. The output unit 150 includes the display module 151, an audio output module 152, an alarm unit 153, and a haptic module 154, and a projector module 155 and the like.

The display module 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display module 151 can be implemented in the optical transmittive type as well. In this configuration, a user is able to see an object in rear of a terminal body via the area occupied by the display module 151 of the terminal body.

At least two display modules 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display module 151 and the touch sensor configures a mutual layer structure (hereinafter called 'touch screen'), it is able to use the display module 151 as an input device as well as an output device. In this case, the touch sensor may be configured as a touch film, a touch sheet, a touchpad or the like.

The touch sensor can be configured to convert a pressure applied to a specific portion of the display module 151 or a variation of a capacitance generated from a specific portion of the display module 151 to an electric input signal. Moreover, it is able to configure the touch sensor to detect a pressure of a touch as well as a touched position or size.

If a touch input is made to the touch sensor signal(s) corresponding to the touch is transferred to a touch controller. The touch controller processes the signal(s) and then transfers the processed signal(s) to the controller 180. Therefore, the controller 180 is able to know whether a prescribed portion of the display module 151 is touched.

A proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm module 153 outputs a signal for announcing the occurrence of a particular event associated with the mobile terminal 100. Typical events include a call received event, a message received event and a touch input received event. The alarm module 153 is able to output a signal for announcing the event occurrence by way of vibration as well as video or audio signal. The video or audio signal can be output via the display module 151 or the audio output unit 152. Hence, the display 151 or the audio output module 152 can be regarded as a part of the alarm module 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 can perform an image project operation using the mobile device 100, and is able to display an image, which is same or partly different to the an image displayed on the display module 151, on an external screen or a wall according to a control signal of the controller 180.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

Moreover, the memory 160 includes at least one of a POI database for storing POI information and a geographical database for storing geographical information. The geographical information includes map data generated using road information and a traffic regulation conditions previously investigated by a predetermined information center. The POI can be a predetermined area set by a user such as home, office, health club. However, the POI can be a area which is pre-stored in a navigation server or a mobile device 100 such as restaurant, hotel, oil station, school, public institution, store, park. The POI information is information related to the POI, and can include user's POI time information corresponding to the POI.

The interface module 170 is often implemented to couple the mobile terminal 100 with external devices. The interface module 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface module 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. Also, the controller 180 may include a graphic module 182 controlling a graphic tool or a graphic effect of a standby screen of the display module 151 by a user's setting. the controller 180 may include a graphic user interface module 183 controlling a state of a graphic user interface or inter-operate other graphic user interface.

The multimedia module 181, the graphic module 182, and the graphic user interface module 183 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

If a display command of the geographical information and the POI information is received, the controller 180 of the mobile device 100 searches the geographical information and the POI information in a predetermined distance from an arbitrary basis coordinate, and controls the display module 151 to display the searched geographical information and POI information.

Figure 2:
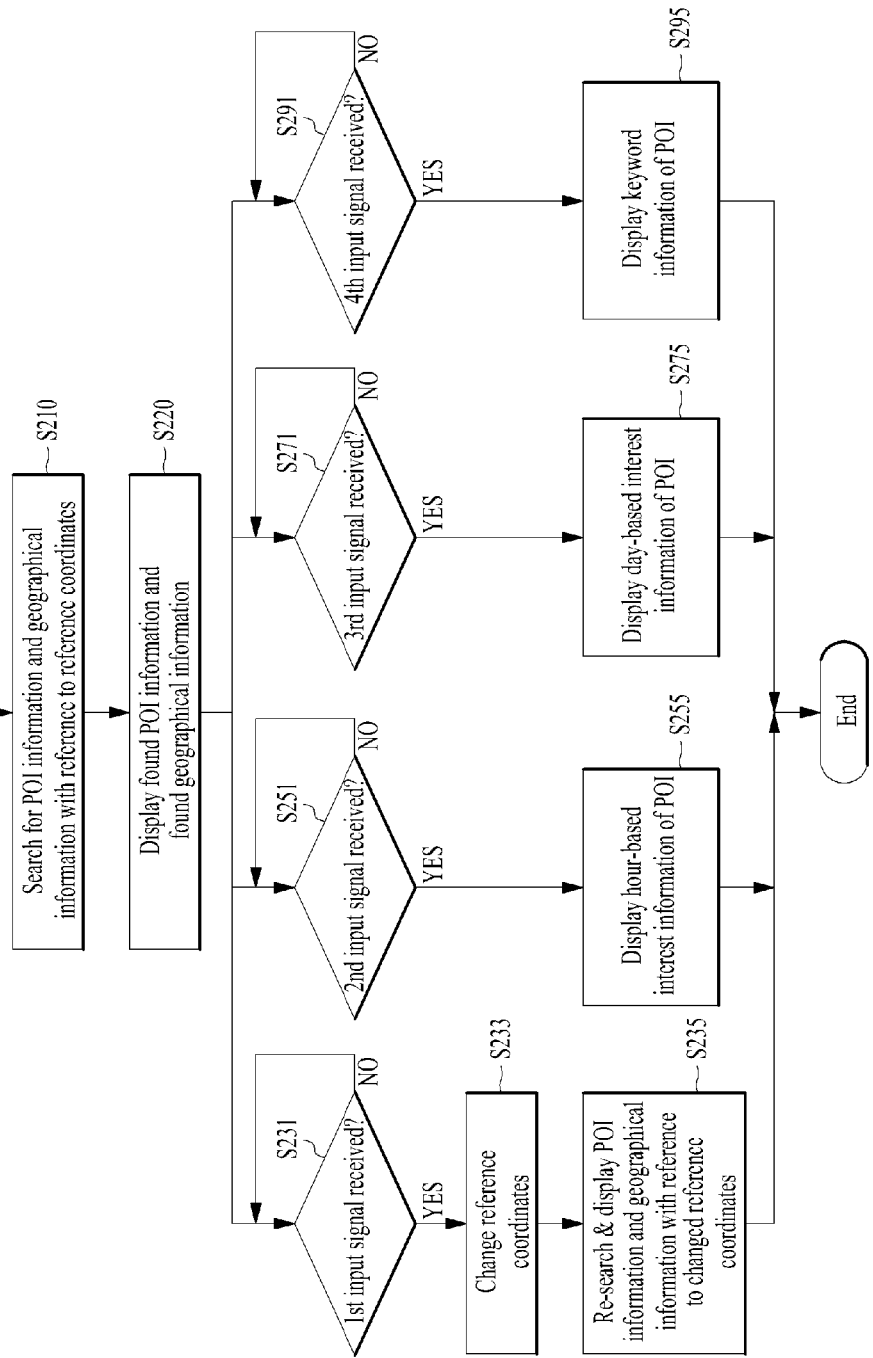
FIG. 2 is a flowchart for a method of controlling a mobile terminal according to a $1^{st}$ embodiment of the present invention.

FIG. 2 is a flowchart for a method of controlling a mobile terminal according to a $1^{st}$ embodiment of the present invention. FIGS. 3 to 6 are diagrams to describe changes of a screen displayed on a display unit in response to $1^{st}$ to $4^{th}$ input signals in a mobile terminal according to a $1^{st}$ embodiment of the present invention, respectively.

In case that a command for displaying a geographical information and a POI (point of interest) information is received in accordance with a user's request, the controller 180 searches the memory 160 for the geographical information and the POI information with reference to random reference coordinates [S210]. In particular, the controller 180 searches for the geographical information and the POI information within a prescribed range from the reference coordinates with reference to the reference coordinates. In this case, the random reference coordinates may include a current location of the user or a preset random point. Based on a result of the search, the controller 180 controls the display module 151 to display the found POI information and the found geographical information [S220]. As a result, referring to FIG. 3 (a), a prescribed geographical information and a prescribed POI information may be displayed on the display module 151. FIG. 3 (a) and FIG. 3 (b) are diagrams of a screen displayed on the display module 151. In FIG. 3 (a) and FIG. 3 (b), POIs include a home, a $1^{st}$ mart 'Costco', a company 'Work', a $2^{nd}$ mart 'E-Mart' and a Cinema for example.

If a $1^{st}$ input signal is received through the user input module 130 [S231], the controller 180 can shift reference coordinates [S233]. Subsequently, the controller 180 searches for geographical information and POI information again with reference to the shifted reference coordinates and then controls the found geographical information and the found POI information to be displayed on the display module 151 [S235]. In this case, the $1^{st}$ input signal may include a user's touch input signal performed in a manner of being shifted in a prescribed direction on the display module 151. If so, the reference coordinates can be shifted based on the prescribed direction, in which the touch input signal has been shifted, and a shifted distance of the input signal. Hence, a map information and the POI information displayed on the display module 151 may be shifted. In particular, after the map information and the POI information have been displayed on the display module 151 [FIG. 3 (a)]. If the reference coordinates are shifted in a left direction by a prescribed distance in response to the $1^{st}$ input signal of the user, the map information can be displayed in a manner of being shifted by the prescribed distance on the display module 151 [FIG. 3 (b)]. In this case, the $1^{st}$ input signal may include an x-directional signal of the display module 151, i.e., an input signal in left/right direction.

If a $2^{nd}$ input signal is received through the user input module 130 [S251], the controller 180 can control the display module 151 to display a hour-based interest information in the POI information [S255]. If a $3^{rd}$ input signal is received through the user input module 130 [S271], the controller 180 can control the display module 151 to display a day-based interest information in the POI information [S275].

The definition of the POI (point of interest) information can refer to the former description with reference to FIG. 1. Additionally, the POI information may include POI time information corresponding to POI information per user's view. In this case, the POI time information may include day-based interest information and hour-based interest information on a prescribed day. The hour-based interest information may include a user's per-hour schedule list and the day-based interest information may include a user's per-day schedule list.

Figure 4:
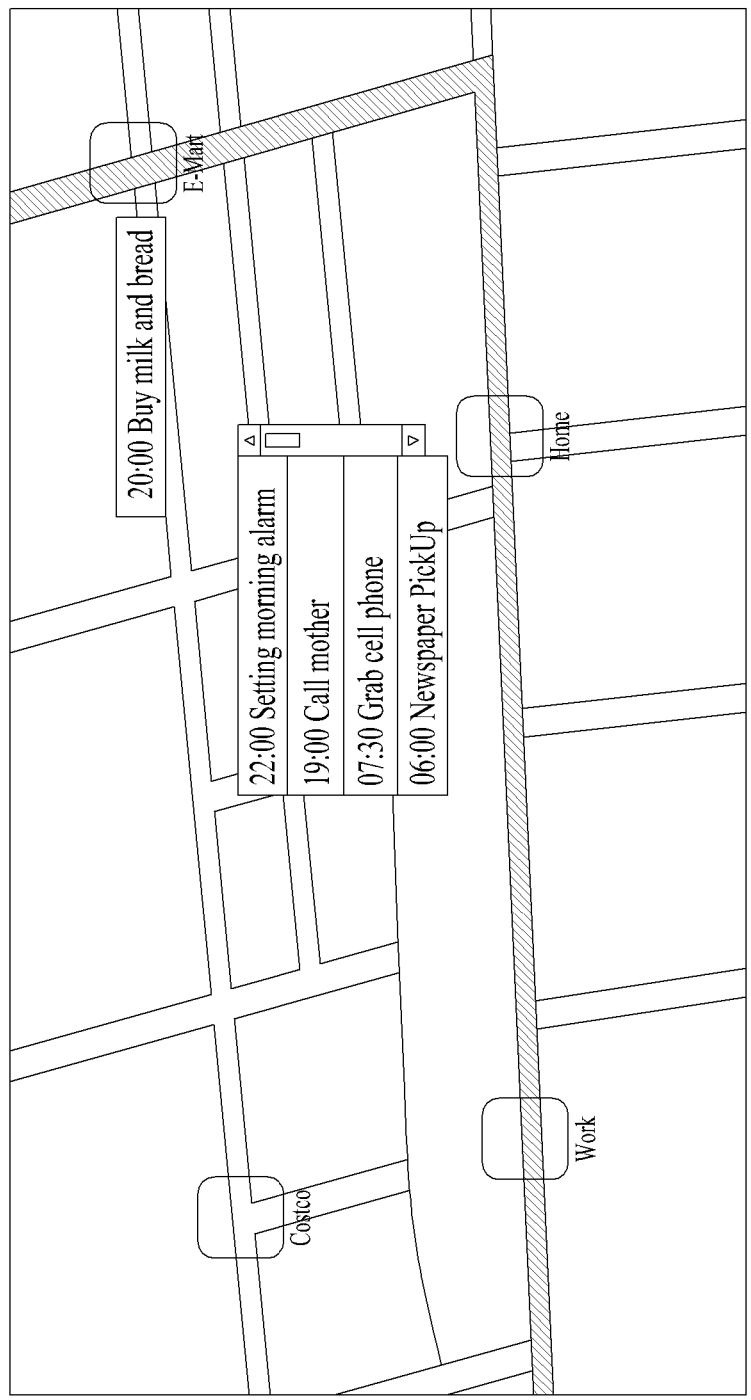
Figure 5:
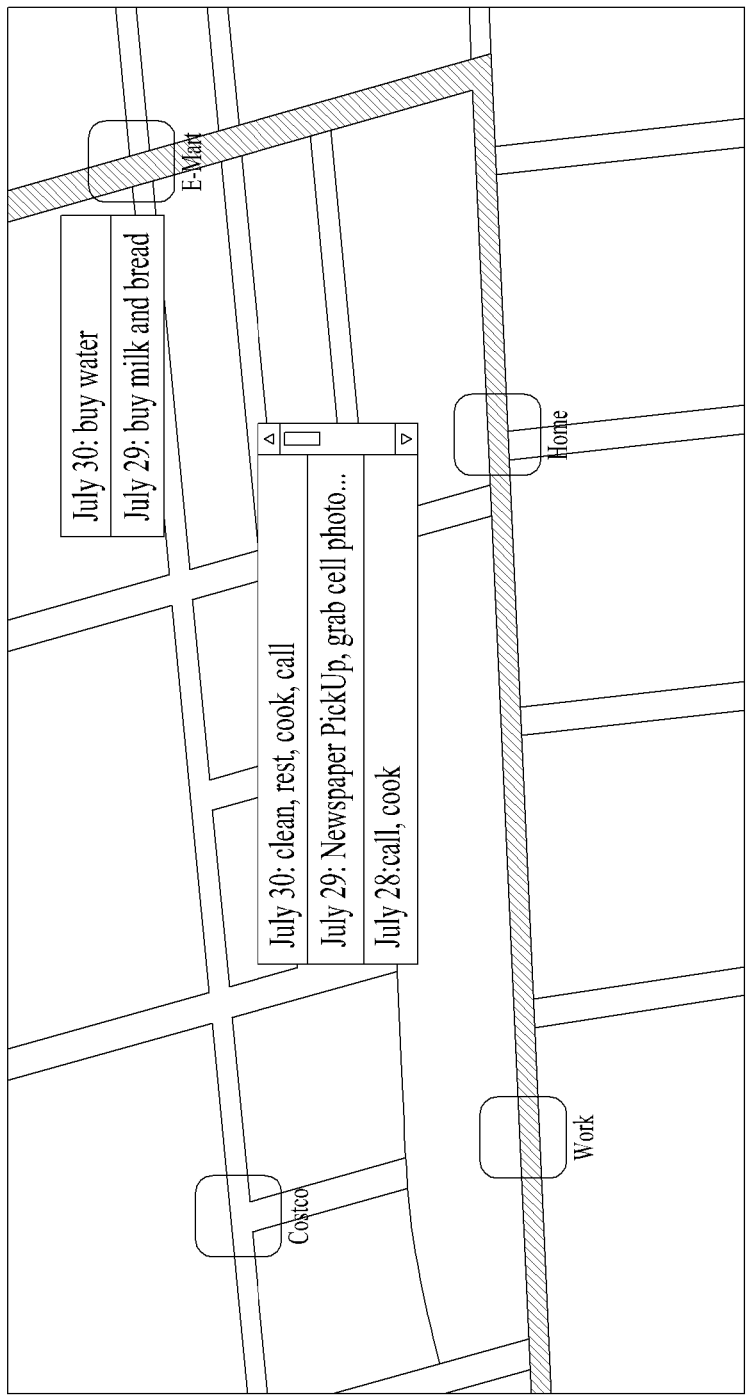

FIG. 4 is a diagram of a screen displayed on the display module 151 in response to the $2^{nd}$ input signal. And, FIG. 5 is a diagram of a screen displayed on the display module 151 in response to the $3^{rd}$ input signal.

As mentioned in the foregoing description, if the $2^{nd}$ input signal is inputted [S251], the hour-based interest information can be displayed on the display module 151. In this case, the hour-based interest information corresponds to a user's per-hour schedule. In particular, referring to FIG. 4, after a user has set up per-hour schedules including 'newspaper pickup' at 06:00, 'grab cell phone' at 07:30, 'call mother' at 19:00, and 'setting morning alarm' at 22:00 for Home and also has set up 'buy milk and bread' at 20:00 for E-Mart, if the $2^{nd}$ input signal is inputted, the set-up per-hour schedules are displayed. In case that a plurality of per-hour schedules are set up for a single POI, if the screen is scrolled to a POI corresponding to Home, as shown in the drawing, the per-hour schedules can be displayed on the display module 151 to view the schedules at the rest of hours. Preferably, the per-hour schedule includes a per-hour schedule on a present day.

According to one embodiment of the present invention, if the $2^{nd}$ input signal is inputted, hour-based interest information set up for all POIs displayed on the display module 151 can be displayed. Yet, according to another embodiment of the present invention, hour-based interest information on a POI selected by a user from a plurality of the POIs displayed on the display module 151 may be displayed only. In this case, the $2^{nd}$ input signal may include an input signal in y-direction on the display module 151, i.e., an input signal in a top/bottom direction.

As mentioned in the foregoing description, if the $3^{rd}$ input signal is inputted [S271], the day-based interest information can be displayed on the display module 151. In this case, the day-based interest information corresponds to a user's per-day schedule. In particular, referring to FIG. 5, a user sets up per-day schedules including 'call' and 'cook' on July 28, 'newspaper pickup' and 'grab cell phone' on July 29, 'clean', 'rest', 'cook' and 'call' on July 30 for home and also sets up 'buy milk and bread' on July 29 and 'buy water' on July 30 for E-Mart. Thus, if the per-day schedules are set up, if the $3^{rd}$ input signal is inputted, the set-up per-day user schedules are displayed. In doing so, if an hour for performing each schedule is set up for the each schedule by the user, hour information set up for each day can be optionally displayed.

According to one embodiment of the present invention, if the $3^{rd}$ input signal is inputted, day-based interest information set up for all POIs displayed on the display module 151 can be displayed. Yet, according to another embodiment of the present invention, day-based interest information on a POI selected by a user from a plurality of the POIs displayed on the display module 151 may be displayed only. In this case, the $3^{rd}$ input signal may include an input signal in z-direction on the display module 151, i.e., a signal generated from pressing a specific point on the user input module 130 for a prescribed duration. In this case, the prescribed duration may include a time within a prescribed time range, e.g., a time ranging between 1 and 2 seconds. If the user input module 130 corresponds to the display module 151 and the display module includes a touch panel, the controller 180 can determine whether the $3^{rd}$ input signal is inputted based on a user's touch time.

Meanwhile, if a $4^{th}$ input signal is inputted through the user input module 130 [S291], the controller 180 can control the display module 151 to display a keyword of POI [S295]. In this case, the $4^{th}$ input signal may include an input signal in z-direction on the display module 151, i.e., a signal generated from pressing a specific point on the user input module 130 for a prescribed duration. Yet, the $4^{th}$ input signal may include an input time in a range different from that of the $3^{rd}$ input signal. For instance, if the $3^{rd}$ input signal includes an input signal maintained during a time ranging between 1 and 2 seconds, the $4^{th}$ input signal may include an input signal maintained over 2 seconds.

Figure 6:
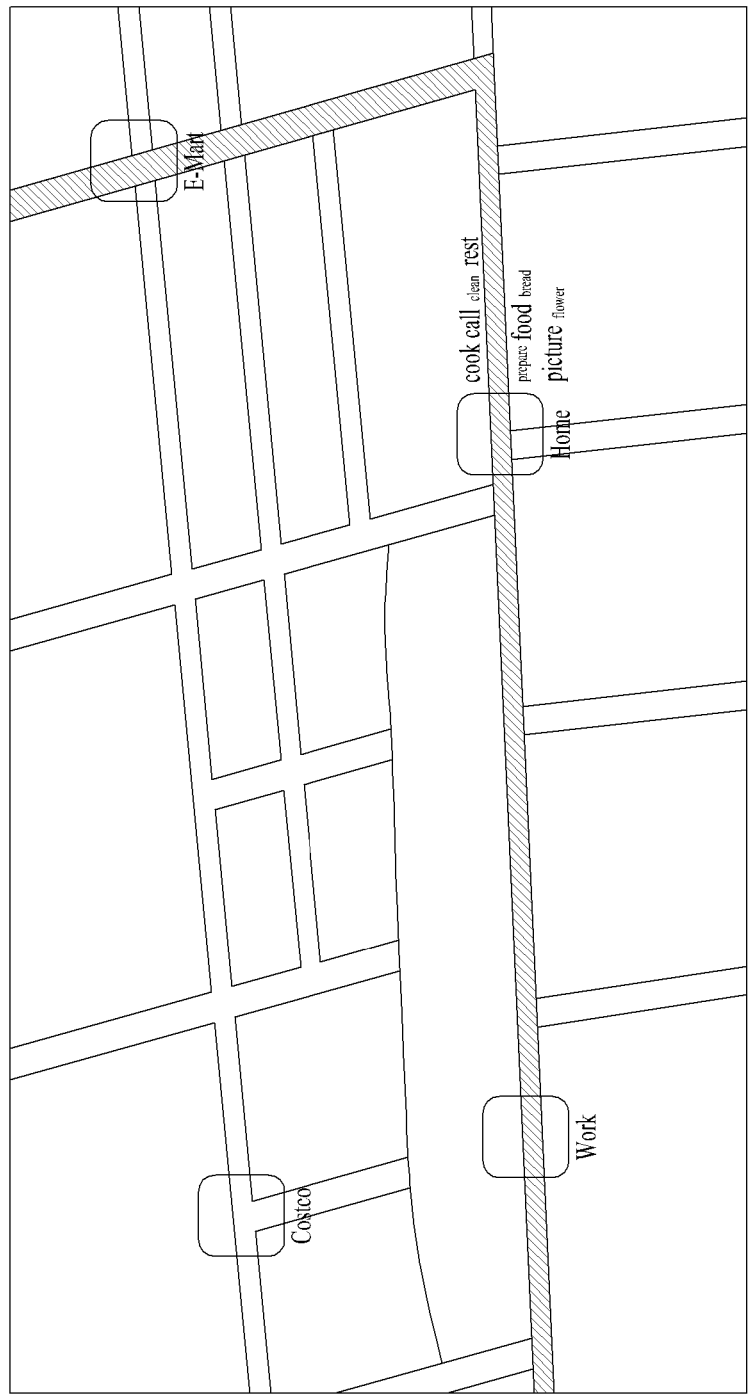

Hence, referring to FIG. 6, if a user presses 'Home' over a prescribed duration, keyword information matching 'Home' can be displayed. In this case, the keyword information may include user's schedules frequently performed in the corresponding POI. In particular, in case that the user frequently performs such a schedule as 'cook', 'call' and the like, 'cook' and 'call' can be displayed as the keyword information on the display module 151.

Figure 7:
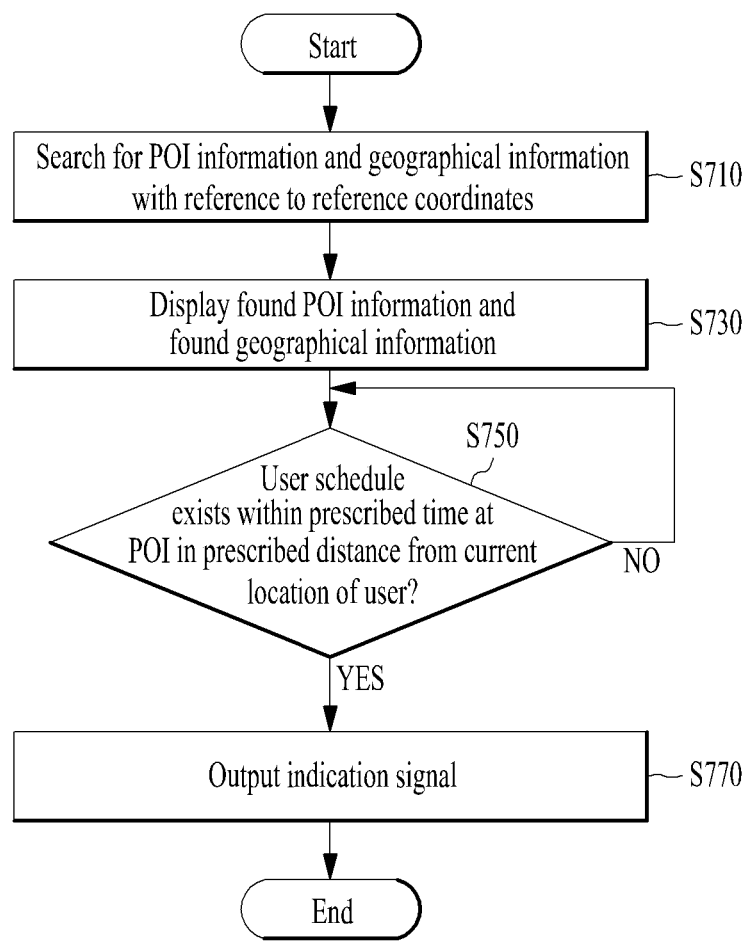
FIG. 7 is a flowchart for a method of controlling a mobile terminal according to a $2^{nd}$ embodiment of the present invention.
Figure 8:
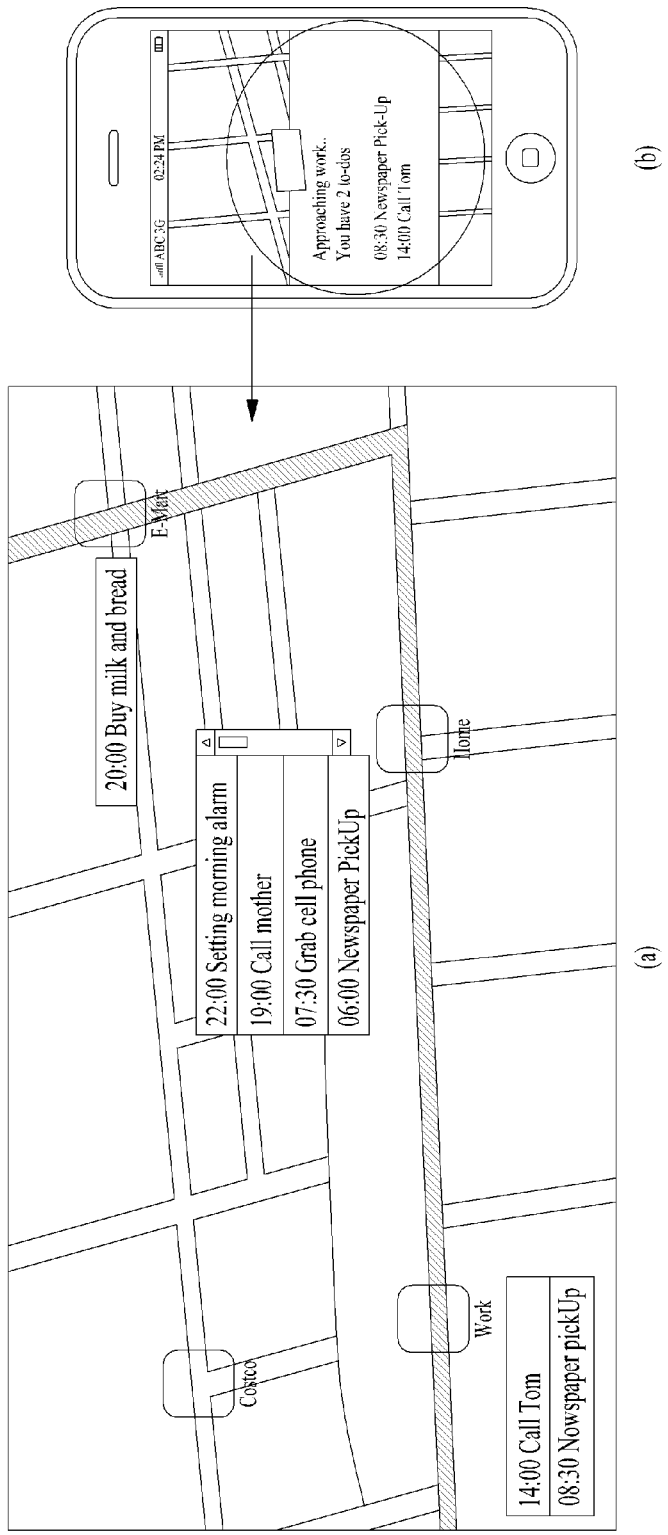
FIG. 8 is a diagram of a screen displayed on a display unit according to a $2^{nd}$ embodiment of the present invention.

FIG. 7 is a flowchart for a method of controlling the mobile terminal 100 according to one embodiment of the present invention. And, FIG. 8 is a diagram of a screen displayed on the display module 151 according to the embodiment shown in FIG. 7. The embodiment shown in FIG. 7 is an embodiment additional to the former embodiment shown in FIG. 3.

Referring to FIG. 7, like FIG. 3, in case that a command for displaying a geographical information and a POI (point of interest) information is received in accordance with a user's request, the controller 180 searches the memory 160 for the geographical information and the POI information with reference to random reference coordinates [S710, S730]. As a result, prescribed geographical information and prescribed POI information can be displayed, as shown in FIG. 3 (a), on the display module 151.

The position location module 115 of the mobile terminal 100 according to the present invention determines a current location of the user and then provides the determined location to the controller 180. The controller 180 determines POI information set for a POI located in a prescribed distance from the current location of the user and then determines whether a user's schedule exists in the corresponding POI within a prescribed time [S750]. As a result of the determination, if the user's schedule exists in the corresponding POI within the prescribed time, the controller 180 can output an indication signal, which informs the user of the existence of the user's schedule, through at least one of the audio output module 152 and the display module 151 [S770].

After user's schedules have been set up [FIG. 8 (a)], if a current location of the user approaches 'Work', the controller 180 can control the display module 151 to display an indication message indicating that a schedule 'Newspaper pickup' at 08:30 and a schedule 'Call Tom' at 14:00 are set up for 'Work' [FIG. 8 (b)].

Figure 9:
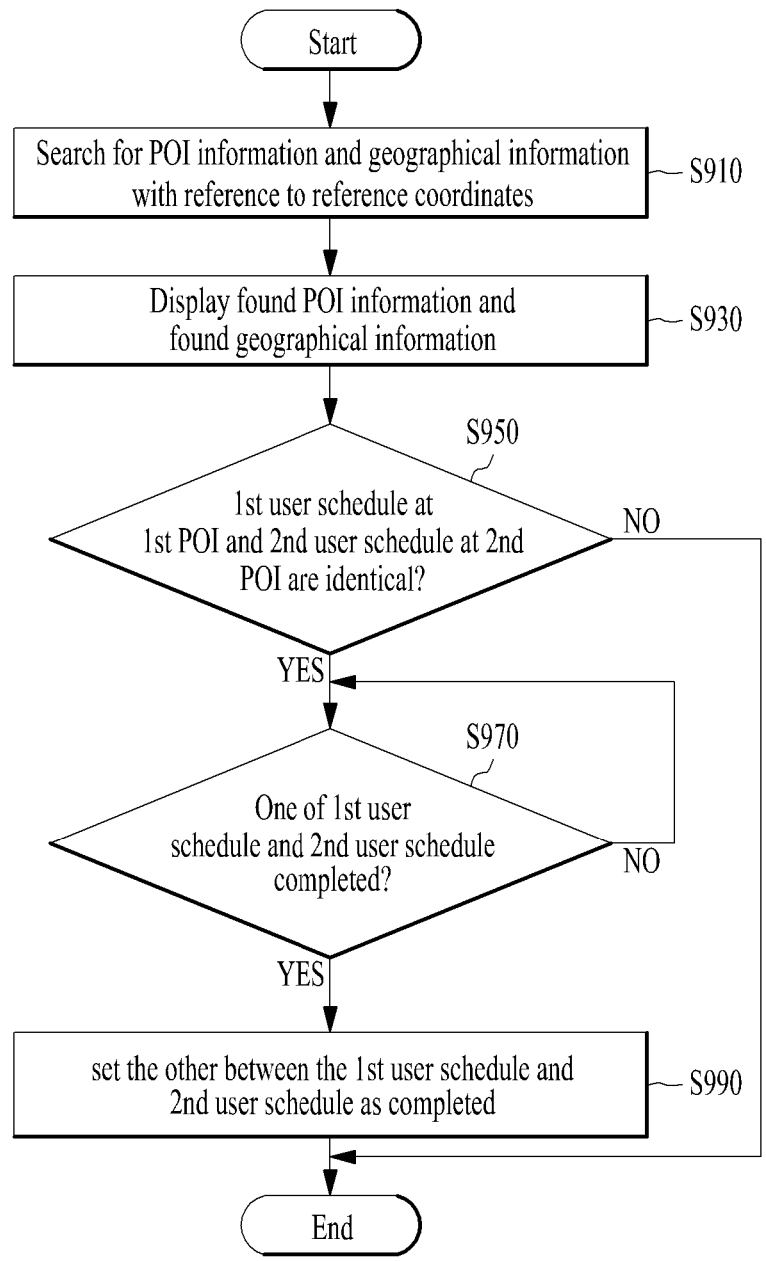
FIG. 9 is a flowchart for a method of controlling a mobile terminal according to a $3^{rd}$ embodiment of the present invention.
Figure 10:
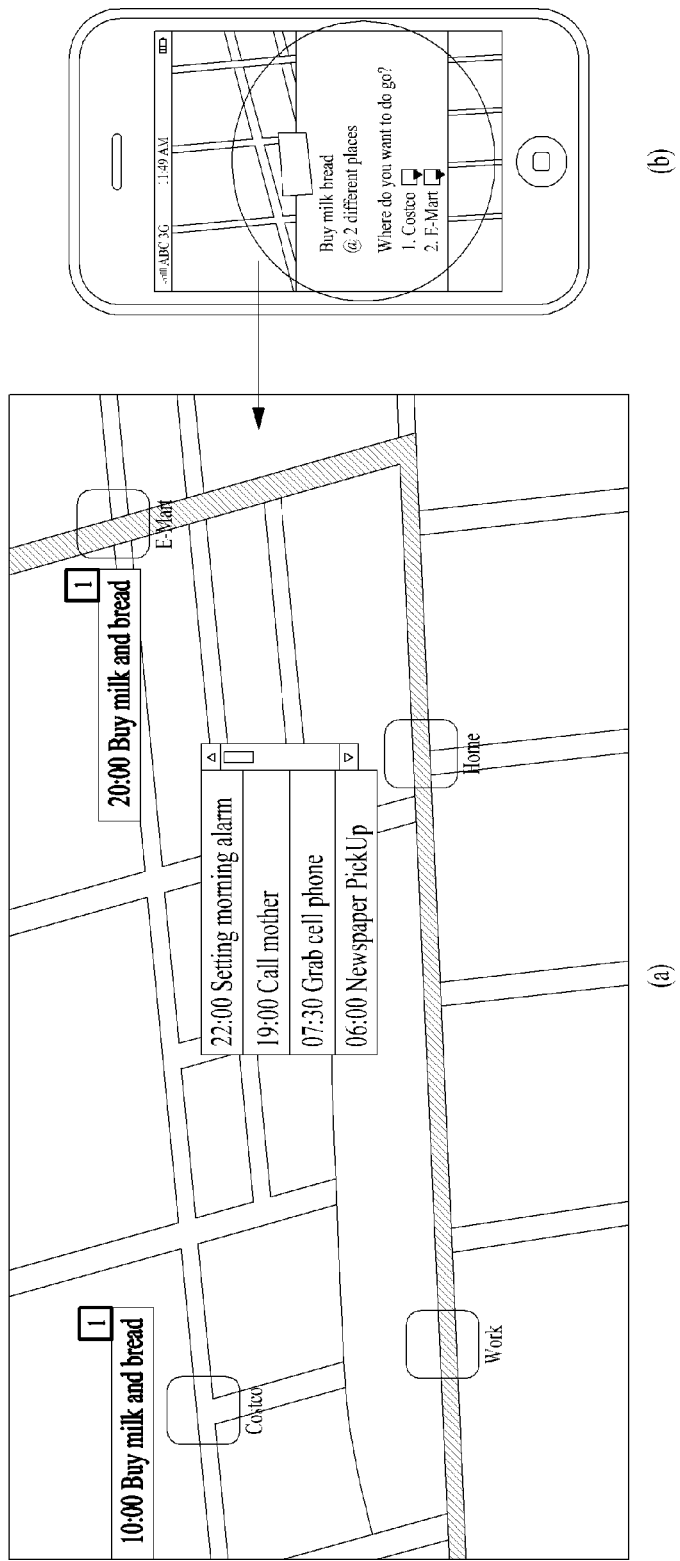

FIG. 9 is a flowchart for a method of controlling the mobile terminal 100 according to one embodiment of the present invention. And, FIG. 10 and FIG. 11 are diagrams of a screen displayed on the display module 151 according to the embodiment shown in FIG. 9. The embodiment shown in FIG. 9 is an embodiment additional to the former embodiments shown in FIG. 3 and FIG. 7. In particular, the former embodiments shown in FIGS. 3, 7 and 9 can be applied to the mobile terminal 100 according to the present invention in a manner of being integrated into a single embodiment.

Referring to FIG. 9, like FIG. 3, in case that a command for displaying a geographical information and a POI information is received in accordance with a user's request, the controller 180 searches the memory 160 for the geographical information and the POI information with reference to random reference coordinates [S910, S930]. As a result, prescribed geographical information and prescribed POI information can be displayed, as shown in FIG. 3 (a), on the display module 151.

A plurality of POIs can be saved in the memory 160 of the mobile terminal 100 according to the present invention. And, a $1^{st}$ user schedule at a $1^{st}$ POI and a $2^{nd}$ user schedule at a $2^{nd}$ POI can be set identical to each other. For instance, referring to FIG. 10 (a), one schedule 'Buy milk and bread' is set up at 10:00 for Costco and another schedule 'Buy milk and bread' is set up at 20:00 for E-Mart. In this case, the $1^{st}$ POI is Costco, the $1^{st}$ user schedule is the schedule 'Buy milk and bread', the $2^{nd}$ POI is E-Mart, and the $2^{nd}$ user schedule is identical to the $1^{st}$ user schedule. In doing so, the common schedule can be displayed on the display module 151 in a manner of being emphasized to facilitate user's recognition of the common schedule [FIG. 10 (a)]. For instance, the common schedule is displayed using bold letters, shade or blinking. And, the number of common schedules can be displayed. Since there is one common schedule shown in FIG. 10 (a), an identification mark '1' is displayed next to each schedule list.

So to speak, if the controller 180 determines that the $1^{st}$ user schedule at the $1^{st}$ POI and the $2^{nd}$ user schedule at the $2^{nd}$ POI are identical to each other [S950], the controller 180 can control the display module 151 to display an indication signal which informs the user that there are schedules identical to each other. In this case, the indication signal can be outputted through at least one of the audio output module 152 and the display module 151. If the $1^{st}$ user schedule and the $2^{nd}$ user schedule are identical to each other, referring to FIG. 10 (b), the controller 180 can indicate that the same user schedule exists at each of two POIs. For instance, the indication signal indicating 'buy milk and bread at 2 different places' can be outputted. In addition, the controller 180 may further output an indication signal querying which place the user wants to go to, i.e., where the user intends to perform the schedule.

Meanwhile, if the controller 180 determines that the $1^{st}$ user schedule at the $1^{st}$ POI and the $2^{nd}$ user schedule at the $2^{nd}$ POI are identical to each other [S950], the controller 180 determines whether at least one of the $1^{st}$ user schedule and the $2^{nd}$ user schedule is completed [S970]. If either the $1^{st}$ user schedule or the $2^{nd}$ user schedule is completed, the controller 180 can set the other as completed [S990].

In particular, the controller 180 of the present invention can control the display module 151 to display a schedule display window for enabling a user to set whether a schedule is completed. In doing so, according to one embodiment of the present invention, referring to FIG. 11 (a), the schedule display window can include a check box provided next to each schedule to check whether the corresponding schedule is completed. If a signal indicating that one of the $1^{st}$ user schedule and the $2^{nd}$ user schedule is completed is inputted through the schedule display window, the controller 180 can set the other as completed.

According to another embodiment of the present invention, the controller 180 of the present invention can display a schedule display window for querying whether the user intends to perform a schedule at the $1^{st}$ POI or the $2^{nd}$ POI. Through the schedule display window, the schedule at the POI unselected by the user can be set as completed.

Meanwhile, the controller 180 of the mobile terminal 100 according to the present invention controls the display module 151 to display a schedule program (e.g., calendar application) interworking with graphical information for saving a user's schedule at a specific POI. If a user inputs a user schedule to a predetermined program, the controller 180 can control the inputted user schedule to be saved as POI time information in the memory 160.

It will be appreciated by those skilled in the art that various modifications and variations can be made in the present invention without departing from the spirit or scope of the inventions. Thus, the scope of the present invention should be determined by reasonable construction of the appended claims, and it is intended that the present invention covers the modifications and variations of this invention provided they come within the scope of the appended claims and their equivalents.

What is claimed is:

1. A mobile terminal comprising:
a memory storing at least one of a geographical information and a POI (point of interest) information including a POI time information;
a signal input unit configured to receive an input signal from a user;
a display unit configured to display the POI information and the geographical information; and
a controller, if a command for displaying the geographical information and the POI information is received, searching the memory for the POI information and the geographical information in a prescribed distance with reference to random reference coordinates, and controlling the display unit to display the found POI information and the found geographical information, wherein the POI time information includes user's time-based interest information corresponding to the POI, wherein the user's time-based interest information comprises a day-based interest information and an hour-based interest information on a prescribed day, wherein the day-based interest information comprises a per-day schedule list of the user at the POI and the hour-based interest information comprises a per-hour schedule list of the user at the POI, wherein if a $1^{st}$ input signal is received through the signal input unit, the controller changes the POI information and the geographical information displayed on the display unit by shifting the reference coordinates, wherein if a $2^{nd}$ input signal is received through the signal input unit, the controller controls the display unit to display the hour-based interest information of a prescribed POI, wherein if a $3^{rd}$ input signal is received through the signal input unit, the controller controls the display unit to display the day-based interest information of the prescribed POI, and wherein if a $4^{th}$ input signal is received, the controller controls the display unit to display a keyword information of the POI.

2. The mobile terminal of claim 1, wherein if the signal input unit includes a touchscreen, the $1^{st}$ input signal comprises an input signal in a right/left direction, the $2^{nd}$ input signal comprises an input signal in a top/bottom direction, the $3^{rd}$ input signal comprises an input signal within a prescribed time range in a prescribed region of the touchscreen, and the $4^{th}$ input signal comprises an input signal maintained on a prescribed region of the touchscreen over a prescribed time range.

3. The mobile terminal of claim 1, wherein the controller determines a current location of the user, and
wherein if a schedule of the user exists within a prescribed time at a POI in a prescribed distance from the current location of the user, the controller controls the display unit to display a $1^{st}$ indication signal.

4. The mobile terminal of claim 3, wherein if a $1^{st}$ user schedule at a $1^{st}$ POI and a $2^{nd}$ user schedule at a $2^{nd}$ POI are identical to each other, the controller controls the display unit to display a $2^{nd}$ indication signal informing the user that the identical schedules exist.

5. The mobile terminal of claim 4, wherein the controller controls the display unit to display a schedule display window for enabling the user to set whether the schedule is completed, and
wherein if the $1^{st}$ user schedule is set as completed through the schedule display window, the controller also sets the $2^{nd}$ user schedule as completed.

6. A method of controlling a mobile terminal, comprising:
receiving, via a signal input unit of the mobile terminal, a command for displaying a geographical information and a POI (point of interest) information;
searching for the POI information and the geographical information in a prescribed distance with reference to random reference coordinates; and
displaying the found POI information and the found geographical information on a display unit of the mobile terminal,
wherein the POI time information includes user's time-based interest information corresponding to the POI,
wherein the user's time-based interest information comprises a day-based interest information and an hour-based interest information on a prescribed day,
wherein the day-based interest information comprises a per-day schedule list of the user at the POI and the hour-based interest information comprises a per-hour schedule list of the user at the POI,
wherein if a $1^{st}$ input signal is received through the signal input unit, changing the POI information and the geographical information displayed on the display unit by shifting the reference coordinates,
wherein if a $2^{nd}$ input signal is received through the signal input unit, controlling the display unit to display the hour-based interest information of a prescribed POI,
wherein if a $3^{rd}$ input signal is received through the signal input unit, controlling the display unit to display the day-based interest information of the prescribed POI, and
wherein if a $4^{th}$ input signal is received, controlling the display unit to display a keyword information of the POI.

7. The method of claim 6, wherein the POI time information includes user's per-view interest information corresponding to a POI.

* * * * *